(12) United States Patent
Zhao et al.

(10) Patent No.: US 9,077,260 B2
(45) Date of Patent: Jul. 7, 2015

(54) BOOST POWER FACTOR CORRECTION CONTROLLER

(71) Applicant: Silergy Semiconductor Technology (Hangzhou) LTD, Hangzhou, ZheJiang Province (CN)

(72) Inventors: Chen Zhao, Hangzhou (CN); Jie Yao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 453 days.

(21) Appl. No.: 13/714,261

(22) Filed: Dec. 13, 2012

(65) Prior Publication Data
US 2013/0163300 A1 Jun. 27, 2013

(30) Foreign Application Priority Data
Dec. 26, 2011 (CN) .......................... 2011 1 0440257

(51) Int. Cl.
*H02M 1/42* (2007.01)

(52) U.S. Cl.
CPC ................ *H02M 1/42* (2013.01); *Y02B 70/126* (2013.01); *H02M 1/4225* (2013.01)

(58) Field of Classification Search
CPC ... H02M 1/42; H02M 1/4208; H02M 1/4225; H02M 1/4233; H02M 1/425; H02M 1/4258; H02M 1/4266; H02M 2001/4275; H02M 2001/4283; H02M 2001/4291

USPC .................. 323/207, 222, 290, 301, 351; 363/80–82, 84–85, 88–89
See application file for complete search history.

(56) References Cited

U.S. PATENT DOCUMENTS

| | | | | |
|---|---|---|---|---|
| 6,657,417 | B1* | 12/2003 | Hwang | 323/222 |
| 7,148,664 | B2* | 12/2006 | Takahashi et al. | 323/222 |
| 7,683,595 | B2* | 3/2010 | Feldtkeller et al. | 323/282 |
| 8,345,456 | B2* | 1/2013 | Nishikawa | 363/89 |
| 8,379,420 | B2* | 2/2013 | Orr | 363/80 |
| 8,441,821 | B2* | 5/2013 | Gao et al. | 363/84 |
| 2006/0022648 | A1* | 2/2006 | Ben-Yaakov et al. | 323/222 |
| 2010/0270984 | A1* | 10/2010 | Park et al. | 323/211 |
| 2011/0157940 | A1* | 6/2011 | Zhang | 363/126 |
| 2013/0223119 | A1* | 8/2013 | Zhao et al. | 363/89 |

* cited by examiner

*Primary Examiner* — Timothy J Dole
*Assistant Examiner* — Shahzeb K Ahmad
(74) *Attorney, Agent, or Firm* — Michael C. Stephens, Jr.

(57) ABSTRACT

The present invention relates to a power factor correction (PFC) controller. In one embodiment, a boost PFC controller configured in an AC/DC converter can include: (i) a conductive signal generator configured to receive a first sampling signal, and to generate a conductive signal according to the first sampling signal and a first control signal; (ii) a shutdown signal generator configured to compare a second control signal against a third control signal, and to generate a shutdown signal when the second control signal reaches a level of the third control signal; and (iii) a logic controller coupled to the conductive signal generator and the shutdown signal generator to control a switching state of a power switch in AC/DC converter.

12 Claims, 4 Drawing Sheets

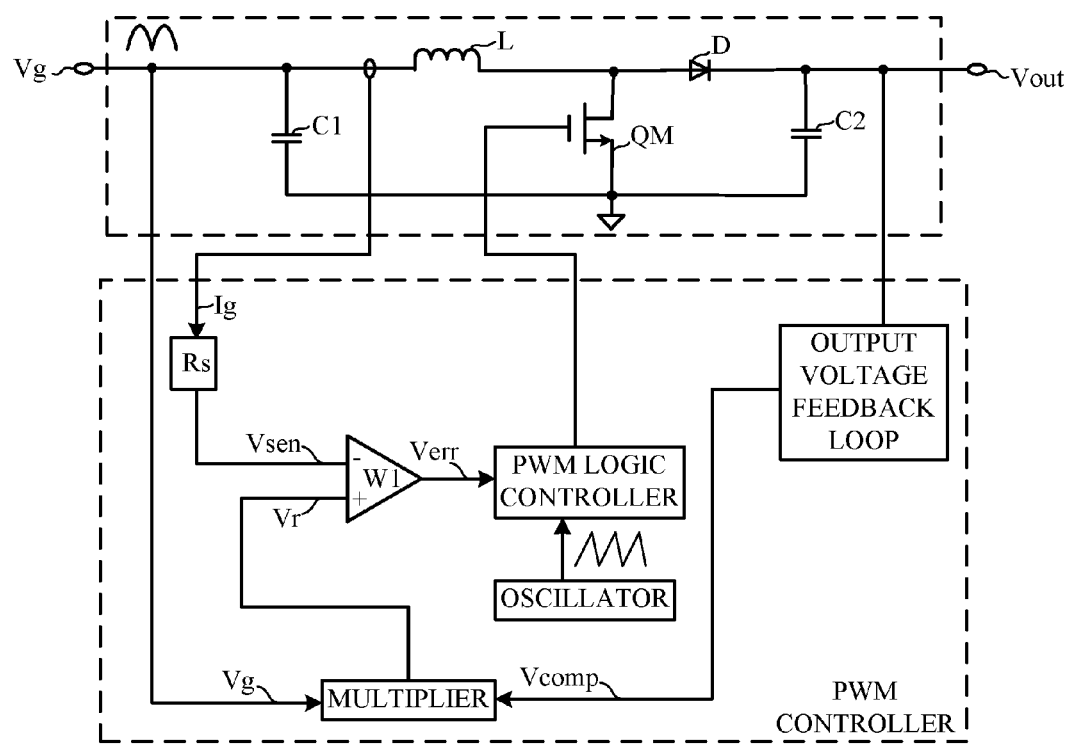
FIG. 1 (conventional)

BOOST POWER FACTOR CORRECTION CONTROLLER

RELATED APPLICATIONS

This application claims the benefit of Chinese Patent Application No. 201110440257.5, filed on Dec. 26, 2011, which is incorporated herein by reference in its entirety.

FIELD OF THE INVENTION

The present invention relates to the field of power factor correction (PFC), and more specifically to a boost power factor correction controller.

BACKGROUND

In order to reduce harmonic distortions caused by power electronics devices on power system, a power factor correction (PFC) circuit can be used to achieve a good power factor by controlling an AC current in sinusoidal and in phase with the AC voltage. The most common type of PFC circuit is a boost converter. In high power applications, an example boost converter operable in a continuous conduction mode (CCM) is shown in FIG. 1. The example of FIG. 1 can include a power stage circuit and a pulse width modulation (PWM) controller. The power stage can be a boost converter including inductor L, power switch QM, diode D, input capacitor C1, and output capacitor C2.

The PWM controller with current and voltage loops can include: (i) an output voltage feedback loop used to detect output voltage Vout and generate output voltage feedback error signal Vcomp; (ii) a multiplier used to generate reference signal Vr according to a rectified input voltage Vg and output voltage feedback error signal Vcomp; (iii) an inductor current sampling circuit Rs used to obtain sampling voltage signal Vsen through averaging the detected inductor current signal Ig; (iv) an operational amplifier W1 used to generate error voltage signal Verr by comparing and amplifying sampling voltage signal Vsen and reference signal Vr, where sampling voltage signal Vsen is received at its inverting terminal and reference signal Vr at its non-inverting signal; and (v) a PWM logic controller used to generate a switch controlling signal for power switch QM by comparing error voltage signal Verr against a saw-tooth wave, where the saw-tooth wave can be generated by an oscillator.

By controlling the PFC circuit in an average current mode, the current from the AC line can be sinusoidal and in phase with the AC voltage to achieve a good power factor. However, in such a conventional PWM controller, an oscillator may be needed to generate a saw-tooth wave with a fixed clock frequency to obtain a fixed operating frequency for power switch QM. Also, in order to generate reference signal Vr, it may be necessary to detect input rectified voltage Vg, which may increase the pin count of the PWM controller. Therefore, such conventional approaches may be more complex and expensive when designing a CCM boost PFC controller.

SUMMARY

In one embodiment, a boost PFC controller configured in a AC/DC converter can include: (i) a conductive signal generator configured to receive a first sampling signal representing an inductor current, where the first sampling signal is used to compare with a first control signal, the first control signal is in proportion to and rises during a shutdown time of a power switch of the AC/DC converter, where when the first control signal reaches a level of a first sampling signal, the conductive signal generator outputs a conductive signal; (ii) a shutdown signal generator configured to compare a second control signal and a third control signal, where the second control signal is in proportion to and rises during the conductive time of the power switch with a first proportionality coefficient, and the third control signal is in proportion to the duty cycle of the power switch with a second proportionality coefficient, where when the second control signal reaches a level of the third control signal, the shutdown signal generator outputs a shutdown signal; and (iii) a logic controller coupled to the conductive signal generator and the shutdown signal generator, where when the conductive signal is activated, the logic controller turns the power switch on, and when the shutdown signal is activated, the logic controller turns the power switch off.

Embodiments of the present invention can advantageously provide several advantages over conventional approaches. For example, a boost PFC controller configured in an AC/DC converter can control a switching state of a power switch by applying a conductive signal generator and a shutdown signal generator, and to further control a switching frequency or switching cycle of the power switch in a substantially constant frequency or jitter frequency. With a conductive signal generator and shutdown signal generator, design of an input electromagnetic interference (EMI) filter can be facilitated. Also, the boost PFC controller may not need to detect the input voltage, which can reduce the pin count of the controller, and thus associated product costs. In addition, an input voltage feed forward circuit can be utilised to provide a relationship between the output control signal and the input power of the AC/DC converter, instead of the input voltage thereof, to satisfy wide voltage range design requirements. Other advantages of the present invention may become readily apparent from the detailed description of preferred embodiments below.

BRIEF DESCRIPTION OF THE DRAWINGS

FIG. 1 is a block diagram of an example conventional CCM boost PFC controller.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 2:
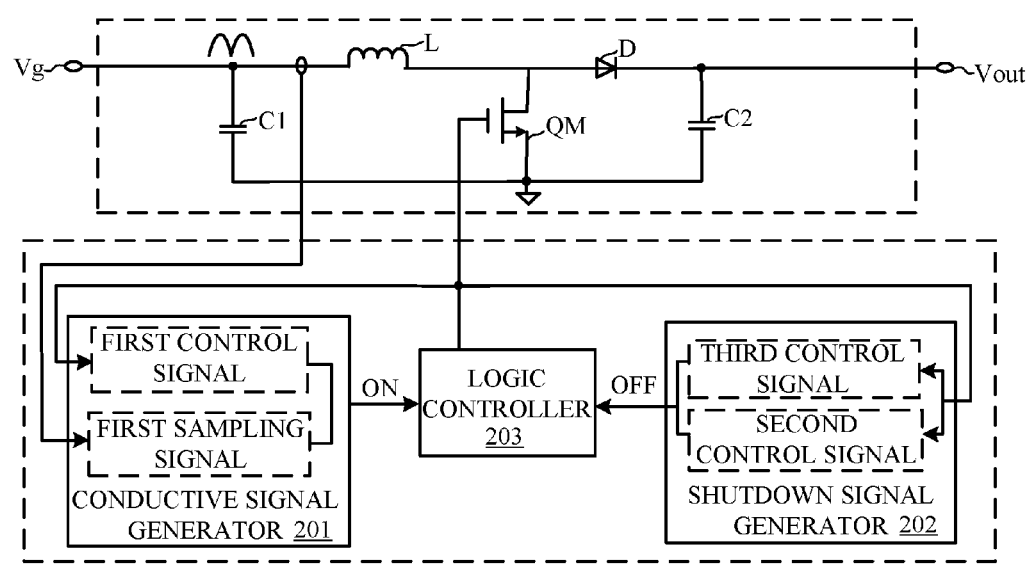
FIG. 2 is a block diagram of a first example boost PFC controller in accordance with embodiments of the present invention.

A boost power factor correction (PFC) controller in accordance with embodiments of the present invention can be used in AC/DC converters, where an AC/DC converter can include a power stage circuit as shown in FIG. 1 with the same or similar components. Referring now to FIG. 2, shown is a block diagram of a first example boost PFC controller in accordance with embodiments of the present invention. The boost PFC controller in this example can include conductive signal generator 201, shutdown signal generator 202, and logic controller 203.

Conductive signal generator 201 can be used to receive a first sampling signal, where the first sampling signal can represent an inductor current. A first control signal generated by conductive signal generator 201 can be in proportional to the shutdown time of power switch QM. When power switch QM is shutdown (e.g., in an off or inactivated state), the first control signal can keep rising until reaching a level of the first sampling signal, and then a conductive signal can be generated.

Shutdown signal generator 202 can be used to compare a second control signal against a third control signal, where the second control signal can be in proportional to the conductive time of power switch QM with a first proportionality coefficient. Also, the third control signal can be in proportional to a duty time of power switch QM with a second proportionality coefficient. When power switch QM is conducting, the second control signal can keep rising until reaching a level of the third control signal, and then a shutdown signal can be generated. Logic controller 203 can connect to conductive signal generator 201 and shutdown signal generator 202. When the conductive signal is activated, logic controller 203 can be used to turn on power switch QM. When shutdown signal is activated, logic controller 203 can be used to turn off power switch QM.

It can be concluded from the above description that conductive signal generator 201 can be used to control a shutdown time of power switch QM, while shutdown signal generator 202 can be used to control a conductive time of power switch QM. Also, if the proportion of the first proportionality coefficient and the second proportionality coefficient is a constant value, the switching cycle of power switch QM can be fixed. Otherwise, the switching cycle of power switch QM can be variable.

In this example boost PFC controller, the operating frequency of power switches in the AC/DC converter can be controlled by conductive signal generator 201 and shutdown signal generator 202. In order to facilitate the design of an electromagnetic interference (EMI) filter on the input side, conductive signal generator 201 and shutdown signal generator 202 can be used to control the shutdown time and conductive time of power switch QM according to the variation of input current. In this way, a fixed operating frequency of power switch QM can be achieved, as well as a substantial reduction in the input harmonic. Also, jitter frequency of power switch QM can be realized to meet the EMI test requirements. Therefore, during operation of this example boost PFC controller, the input voltage may be detected, and as a result the pin count of PFC controller can be reduced, leading to smaller circuitry and lower product costs.

Figure 3:
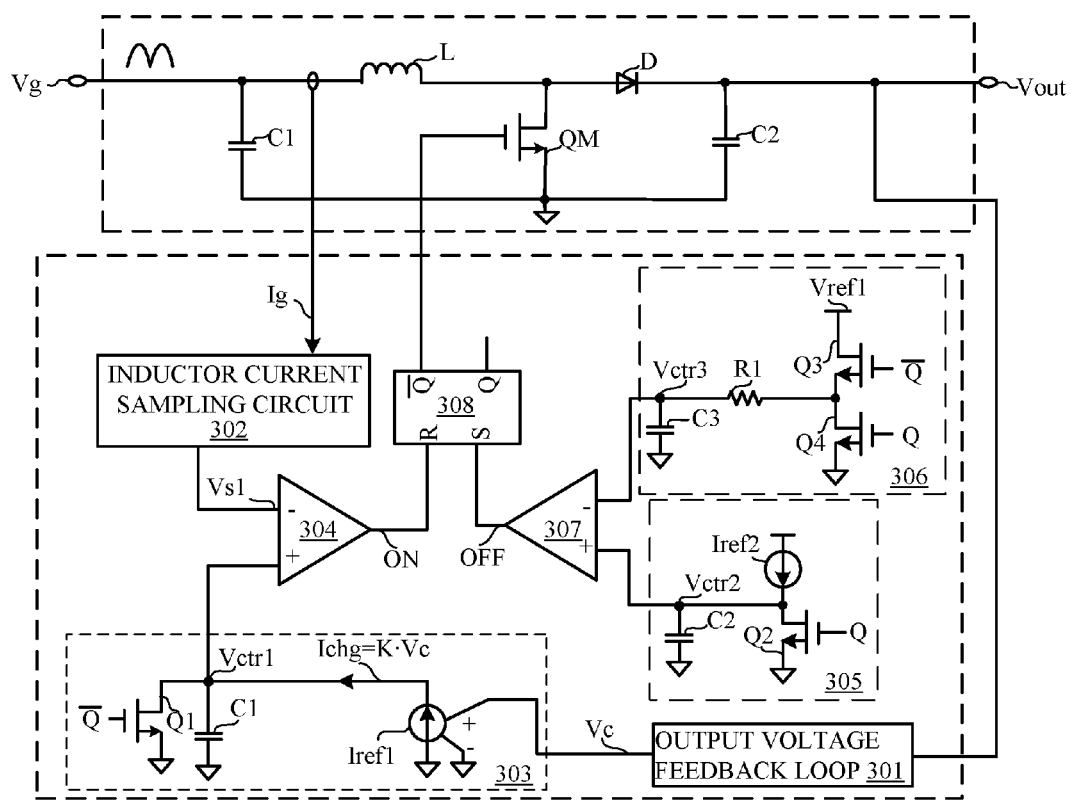
FIG. 3 is a schematic diagram of a second example boost PFC controller in accordance with embodiments of the present invention.

Referring to FIG. 3, shown is a schematic diagram of a second example boost PFC controller in accordance with embodiments of the present invention. In this example, the boost PFC controller can also include output voltage feedback loop 301 based on FIG. 2. Also, specific implementation circuits of conductive signal generator 201, shutdown signal generator 202, and logic controller 203 can be shown in FIG. 3. Specifically, conductive signal generator 201 can include inductor current sampling circuit 302, first control signal generator 303, and comparator 304. Shutdown signal generator 202 can include control signal generator 305, control signal generator 306, and comparator 307. Also, logic controller 203 can be implemented by RS flip-flop 308, where terminal Q of RS flip-flop 308 can connect to the control terminal of power switch QM.

Here, output voltage feedback loop 301 can be used to receive output voltage Vout of the AC/DC converter, and to generate output voltage control signal Vc. Since output voltage feedback loop 301 can connect to first control signal generator 303, so output voltage control signal Vc can be used to control first control signal generator 303 to generate a first control signal, and to maintain the output voltage as substantially constant. Also, as in conductive signal generator 201, inductor current sampling circuit 302 can be used to detect inductor current signal Ig, and to generate first sampling signal Vs1 by averaging inductor current signal Ig.

First control signal generator 303 can include a first current source, capacitor C1 and switch Q1. The first current source, capacitor C1, and switch Q1 can be connected in parallel. The first current source can be implemented by a voltage controlled current source (VCCS) Iref1 that can be controlled by output voltage control signal Vc. VCCS Iref1 can be used to receive output voltage control signal Vc, and to generate charging current Ichg. The control terminal of switch Q1 can be connected to terminal $\overline{Q}$ of RS flip-flop 308, and a switching state of switch Q1 can be consistent with the switching state of power switch QM. Also, switch Q1 can be used to control charging and discharging of capacitor C1, and the cross voltage on capacitor C1 can be configured as first control signal Vctr1.

Comparator 304 can be used to receive first control signal Vc1 at its non-inverting terminal, and first sampling signal Vs1 at its inverting terminal. When switch Q1 is turned off, first control signal Vctr1 can continue to rise until reaching a level of first sampling signal Vs1, and then first comparator 304 may output conductive signal ON.

As in shutdown signal generator 202, second control signal generator 305 can include second current source Iref2, capacitor C2, and switch Q2. Second current source Iref2 can be connected in series with switch Q2, and capacitor C2 can be connected in parallel with second switch Q2. The control terminal of switch Q2 can be connected to terminal Q of RS flip-flop 308, so a switching state of switch Q2 can be opposite to a switching state of power switch QM. Switch Q2 can be used to control charging and discharging of capacitor C2, and the cross voltage on capacitor C2 can be configured as second control signal Vctr2. In this example, the proportionality coefficient of second control signal Vctr2 and conductive time Ton of power switch QM can be denoted as K1. Also, K1 can denote the proportion of second current source Iref2 and second capacitor C2.

Third control signal generator 306 can include an averaging circuit which can be used to receive first voltage source Vref1, the conductive signal, and shutdown signal of power switch QM, and to generate third control signal Vctr3. As shown in FIG. 3, the averaging circuit can include series connected switches Q3 and Q4, and an RC filter including a resistor R1 and third capacitor C3. The first terminal of switch Q3 can be used to receive first voltage source Vref1, and the control terminal thereof can be connected to the terminal $\overline{Q}$ of RS flip-flop 308. The second terminal of switch Q4 can be connected to ground, and the control terminal thereof can be connected to terminal Q of RS flip-flop 308. The first terminal of resistor R1 can be connected to the common junction of switches Q3 and Q4, and the second terminal of first resistor R1 can be connected to the first terminal of capacitor C3. The second terminal of capacitor C3 can be connected to ground.

The switching state of switch Q3 can therefore be consistent with the switching state of power switch QM, while the switching state of switch Q4 can be opposite to the switching state of power switch QM. With this circuit structure, third control signal Vctr3 can be obtained by chopping and filtering first voltage source Vref1 and in proportional to the duty cycle of power switch QM with a proportionality coefficient K2.

Second comparator 307 can be used to receive second control signal Vctr2 at its non-inverting terminal and third control signal Vctr3 at its inverting terminal. When switch Q2 is turned off, second control signal Vctr2 can continue to rise until reaching a level of third control signal Vctr3, and then comparator 307 may output shutdown signal OFF.

In this example, the reset terminal of RS flip-flop 308 can be used to receive conductive signal ON generated by conductive signal generator 201. When conductive signal ON is activated, RS flip-flop 308 may output a switching control signal at its terminal Q to turn on power switch QM. The set terminal of RS flip-flop 308 can be used to receive the shutdown signal generated by shutdown signal generator 202. When shutdown signal OFF is activated, RS flip-flop 308 may output a switching control signal at its terminal $\overline{Q}$ to turn off power switch QM.

Operation of the example boost PFC controller can be described as follows. When power switch QM is turned off, switches Q1 and Q3 can be in a shutdown state, while switches Q2 and Q4 can be in a conducting state. Since switch Q1 is shutdown, VCCS Iref1 can charge capacitor C1 with charging current Ichg. Thus, first control signal Vctr1 across capacitor C1 can be increased continuously, where Vctr1= (Ichg/C1)*Toff, and Toff can denote the shutdown time of power switch QM. When first control signal Vctr1 reaches a level of first sampling signal Vs1, comparator 304 may output conductive signal ON. RS flip-flop 308 can receive conductive signal ON at its reset terminal and output a switching control signal at its terminal $\overline{Q}$ to turn on power switch QM. On the other hand, since switch Q3 is shutdown and switch Q4 is conducting, capacitor C3 can be discharged through switch Q4. Also, since switch Q2 is conducting, capacitor C2 may not be charged, and shutdown signal generator 202 may be invalid.

When power switch QM is turned on, switches Q1 and Q3 can be in a conductive state, while switches Q2 and Q4 can be in shutdown state. Since switch Q2 is shutdown, second current source Iref2 can charge capacitor C2, so second control signal Vctr2 across capacitor C2 can be increased continuously, where Vctr2=(Iref1/C2)*Ton. At the same time, third control signal Vctr3 across capacitor C3 can be generated, where Vctr3=Vref1·D, and D can denote the duty cycle of power switch QM. When second control signal Vctr2 reaches a level of third control signal Vctr3, comparator 307 can output shutdown signal OFF. RS flip-flop 308 can receive shutdown signal OFF at its set terminal and output a switching control signal at its terminal $\overline{Q}$ to turn off power switch QM. On the other hand, since switch Q1 is conducting, capacitor C1 may not be charged, and conductive signal generator 201 may be disabled.

As described above, when power switch QM is conducting, second control signal Vctr2 can keep rising, and when second control signal Vctr2 reaches a level of third control signal Vctr3, equation (1) below can be obtained:

$$\frac{I_{ref2}}{C_{ref2}} \cdot T_{on} = V_{ref1} \cdot D = V_{ref1} \cdot \frac{T_{on}}{T_{on} + T_{off}} \quad (1)$$

Ts may represent a switching cycle of power switch QM (e.g., Ts=Ton+Toff), and taking Ts into equation (1), the switching cycle Ts can be:

$$T_s = \frac{V_{ref1}}{I_{ref2}} \cdot C_2 \quad (2)$$

As seen from equation (2), the switching frequency of power switch QM may be related to first voltage source Vref1, second current source Iref2, and capacitor C2. In this example, since first voltage source Vref1 can be a constant voltage source and second current Iref2 can be a constant current source, the switching frequency of power switch QM can be fixed. Thus, the operating frequency of power switch QM can be controlled as substantially constant through this boost PFC controller.

Now the following will discuss the process of realizing power factor correction. When power switch QM is turned off, first control signal Vctr1 can continue to rise until reaching a level of first sampling signal Vs1, and equation (3) can be obtained:

$$V_{s1} = \frac{I_{chg}}{C_1} \cdot T_{off} \quad (3)$$

Here, charging current Ichg outputted by VCCS Iref1 equals K·Vc, where K can denote the admittance coefficient of VCCS Iref1. By substituting Ichg into equation (3), shutdown time Toff can be obtained as follows:

$$T_{off} = \frac{V_{s1} \cdot C_1}{K \cdot V_c} \quad (4)$$

When boost PFC circuit is operating in a continuous conduction mode (CCM) state, the input impedance Zin can be:

$$Z_{in} = \frac{V_g}{I_g} = \frac{V_{out} \cdot (1-D)}{I_g} = \frac{V_{out} \cdot \frac{T_{off}}{T_s}}{I_g} \quad (5)$$

As Ts can be obtained in equation (2), and Toff can be obtained in equation (4), equation (5) can be transformed into equation (6):

$$Z_{in} = V_{out} \cdot \frac{V_{s1} \cdot C_1}{K \cdot V_c \cdot I_g} \cdot \frac{I_{ref2}}{V_{ref1} \cdot C_2} \quad (6)$$

Setting C1=C2, and Vref1=Iref2, then:

$$Z_{in} = V_{out} \cdot \frac{V_{s1}}{K \cdot V_c \cdot I_g} = \frac{V_{out}}{K \cdot V_c} \cdot \frac{V_{s1}}{I_g} = \frac{V_{out}}{K \cdot V_c} \cdot R_s \quad (7)$$

Because the transient response of output voltage closed-loop control circuit may be relatively slow, output voltage Vout and output voltage control signal Vc can almost be constant in a switching cycle. Thus, input impedance Zin can be a substantially constant value to maintain the input current in phase with the input voltage, and power factor correction can therefore be realized.

It should be known that the conductive signal generator and shutdown signal generator according to the embodiments of the present invention are not limited by the particular example circuit structures shown in FIG. 3, thus, suitable circuitry with the same function can also be applied. Further, the boost PFC controller in accordance with embodiments of the present invention may not need any inside oscillator to generate clock signals. Instead, a conductive signal generator and a shutdown signal generator can be configured to turn on and turn off the power switch, and to control the switching frequency of power switch to be substantially constant. Through this reduced complexity and low cost circuitry, fixed switching frequency as well as a good power factor can be obtained.

In the example boost PFC controller shown in FIG. 3, the switching cycle or switching frequency of power switch QM can be maintain as substantially constant by setting second current source Iref2 to be a constant current source and setting first voltage source Vref1 to be a constant voltage source. However, in the EMI tests for AC/DC converters, the switching frequency of a power switch should have a small floating range to distribute harmonic distortions, which means the design of an input EMI filter can be facilitated by applying a jitter frequency technology. Thus, with jitter frequency technology, converters may satisfy the requirements of input EMI tests.

As compared to conventional jitter frequency technology, approaches according to embodiments of the present invention may realize this process much easier. As shown in equation (2), the switching cycle or switching frequency of power switch QM may be determined by first voltage source Vref1, second current source Iref2, and second capacitor C1. Thus, the switching cycle or switching frequency of power switch QM can be variable by regulating first voltage source Vref1 or second current source Iref2. In this way, appropriate jitter frequency can be achieved. In practical applications, replacing a constant voltage source with an adjustable voltage source, and/or replacing a constant current source with an adjustable current source, first voltage source Vref1 and second current source Iref2 can be easily regulated in different applications.

Figure 4:
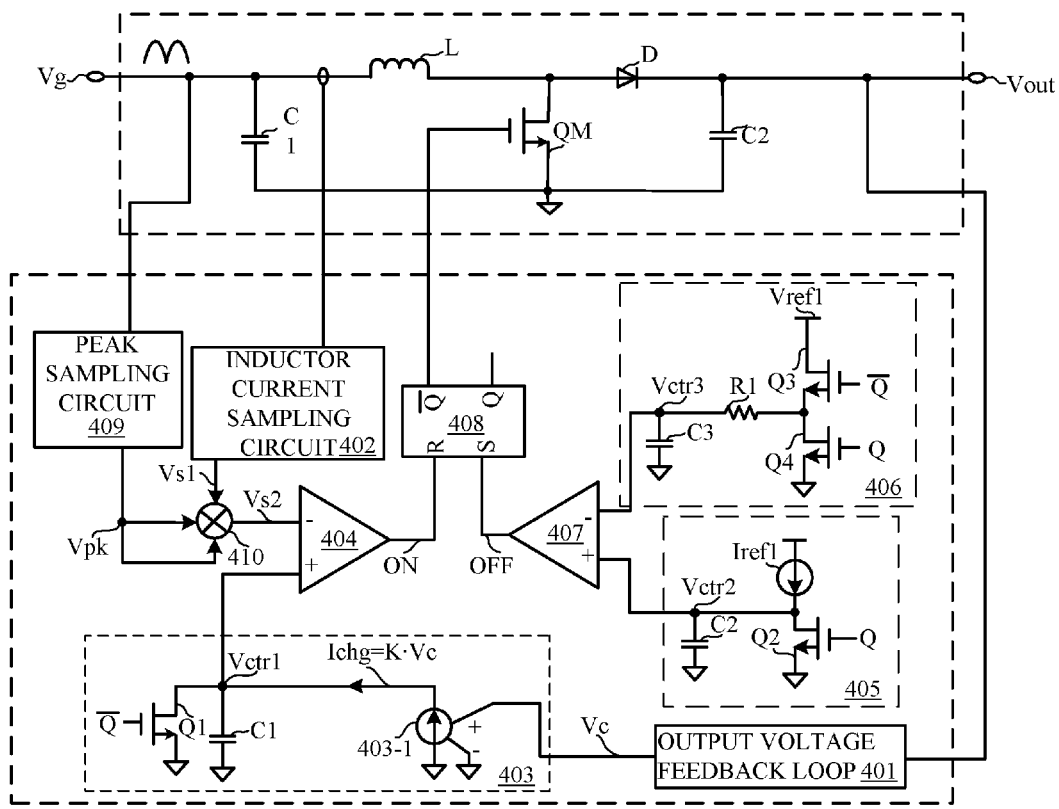
FIG. 4 is a schematic diagram of a third example boost PFC controller in accordance with embodiments of the present invention.

Referring to FIG. 4, shown is a schematic diagram of a third example boost PFC controller in accordance with embodiments of the present invention. In this example, a feed forward controller can be included in the boost PFC controller based on the example shown in FIG. 3. Here, the feed forward controller can include peak sampling circuit 409 and multiplier 410. Peak sampling circuit 409 can be configured to receive an input voltage after being rectified, and generate peak voltage signal Vpk through peak detection.

Multiplier 410 can be used to receive peak voltage signal Vpk and first sampling signal Vs1, and to output second sampling signal Vs2 to the inverting terminal of third comparator 404. Second sampling signal Vs2 may be the product of peak voltage signal Vpk and first sampling signal Vs1, and can be used to compare with first control signal Vctrl to maintain the power of AC/DC converter in proportion to output voltage control signal Vc. Hence, second sampling signal Vs2 can be obtained by equation (8):

$$V_{s2} = V_{s1} \cdot V_{pk} \cdot V_{pk} \tag{8}$$

Similarly to the calculation process of input impedance in the second example, the input impedance here with feed forward circuit in a boost PFC controller can be as shown in equation (9):

$$Z_{in} = V_{out} \cdot \frac{V_{s1} \cdot (V_{pk})^2}{K \cdot V_c \cdot I_g} = V_{out} \cdot \frac{V_{s1}}{I_g} \frac{(V_{pk})^2}{K \cdot V_c} = V_{out} \cdot \frac{(V_{pk})^2}{K \cdot V_c} \cdot R_s \tag{9}$$

Hence, an average input power can be obtained:

$$P_g = \frac{V_g}{Z_{in}} = \frac{(V_g)^2 \cdot K \cdot V_c}{V_{out} \cdot (V_{pk})^2 \cdot R_s} \tag{10}$$

Here, Vg can denote an RMS input voltage. It can be known from equation (10) that input power Pg of the AC/DC converter can be in proportion to output voltage control signal Vc since the proportion of $(Vg)^2$ and $(Vpk)^2$ may almost be a constant value. Also, it can be known that output voltage control signal Vc can be determined by input power Pg rather than input voltage Vg, which can facilitate design over wide voltage range.

The boost PFC control in accordance with embodiments of the present invention can be suitable for CCM mode operation. In addition, particular embodiments may be more flexible as compared to conventional approaches in meeting various requirements of PFC controllers in different applications with constant frequency or jitter frequency. In addition, optimal PFC control methods and EMI designs can be chosen in different practical applications in certain embodiments to achieve the best technology results.

The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the claims appended hereto and their equivalents.

What is claimed is:

1. A power factor correction (PFC) controller configured for an AC/DC converter, the PFC controller comprising:
   a) a conductive signal generator configured to receive a first sampling signal that represents an inductor current, wherein said first sampling signal is configured to be compared against a first control signal, wherein said first control signal is in proportion to and rises during a shutdown time of a power switch of said AC/DC converter, wherein when said first control signal reaches a level of said first sampling signal, said conductive signal generator is configured to output a conductive signal;
   b) a shutdown signal generator configured to compare a second control signal against a third control signal, wherein said second control signal is in proportion to and rises during a conductive time of said power switch with a first proportionality coefficient, wherein said third control signal is in proportion to a duty cycle of said power switch with a second proportionality coefficient, wherein when said second control signal reaches a level of said third control signal, said shutdown signal generator is configured to output a shutdown signal; and
   c) a logic controller coupled to said conductive signal generator and said shutdown signal generator, wherein when said conductive signal is activated, said logic controller is configured to turn said power switch on, and wherein when said shutdown signal is activated, said logic controller is configured to turn said power switch off.

2. The PFC controller of claim 1, wherein a proportion of said first proportionality coefficient to said second proportionality coefficient is substantially constant to maintain a switching cycle of said power switch as substantially constant.

3. The PFC controller of claim 1, wherein a proportion of said first proportionality coefficient to said second proportionality coefficient is adjustable such that a switching cycle of said power switch is configured to be variable.

4. The PFC controller of claim 1, further comprising an output voltage feedback loop, wherein said output voltage feedback loop is configured to receive an output voltage of said AC/DC converter, and to generate an output voltage control signal representing said output voltage.

5. The PFC controller of claim 4, wherein said output voltage feedback loop is coupled to said conductive signal generator to control said first control signal according to said output voltage control signal, and to maintain said output voltage as substantially constant.

6. The PFC controller of claim 1, wherein said conductive signal generator comprises:
a) an inductor current sampling circuit configured to detect said inductor current of said AC/DC converter, and to generate said first sampling signal;
b) a first control signal generator comprising a first current source, a first capacitor, and a first switch that are coupled in parallel, wherein a cross voltage on said first capacitor is configured as said first control signal, and wherein a switching state of said first switch is consistent with a switching state of said power switch; and
c) a first comparator configured to receive said first control signal and said first sampling signal, wherein when said first switch is shutdown, said first control signal is configured to rise until reaching a level of said first sampling signal, and said first comparator is configured to output said conductive signal.

7. The PFC controller of claim 6, wherein said first current source comprises a voltage controlled current source controlled by said output voltage control signal.

8. The PFC controller of claim 1, wherein said shutdown signal generator comprises:
a) a second control signal generator comprising a second current source, a second capacitor, and a second switch, wherein said second current source is coupled in series with said second switch, and said second capacitor is coupled in parallel with said second switch, wherein a cross voltage on said second capacitor is configured as said second control signal, wherein a switching state of said second switch is opposite to a switching state of said power switch, said first proportionality coefficient having a proportion of a current value of said second current source and a capacitance value of said second capacitor;
b) a third control signal generator comprising an averaging circuit, wherein said averaging circuit is configured to receive a first voltage source, said conductive signal, and said shutdown signal of said power switch, and to generate said third control signal, said second proportionality coefficient having a voltage value of said first voltage source; and
c) a second comparator configured to receive said second control signal and said third control signal, wherein said second control signal is configured to rise until reaching a level of said third control signal when said second switch is shutdown, and wherein said second comparator outputs said shutdown signal.

9. The PFC controller of claim 8, wherein said first voltage source comprises a constant voltage source, said second current source comprises a constant current source, and a switching cycle of said power switch is substantially constant.

10. The PFC controller of claim 8, wherein at least one of said first voltage source and said second current source is adjustable, and a switching cycle of said power switch is variable.

11. The PFC controller of claim 1, further comprising a feed forward circuit configured to receive a rectified input voltage, and to generate a peak voltage signal by peak detection, wherein a product of said peak voltage signal and said first sampling signal is configured to be compared against said first control signal to maintain said output voltage control signal in proportion to an input power of said AC/DC converter.

12. The PFC controller of claim 1, wherein said logic controller comprises an RS flip-flop, wherein a reset terminal of said RS flip-flop is coupled to said conductive signal generator, a set terminal of said RS flip-flop is coupled to said shutdown signal generator, and an output terminal of said RS flip-flop is configured to output a switching control signal to control a switching state of said power switch.

* * * * *